United States Patent [19]

Benn et al.

[11] Patent Number: 4,883,617

[45] Date of Patent: Nov. 28, 1989

[54] METHOD OF FORMING BINDERLESS CARBON MATERIALS

[75] Inventors: Malcolm Benn, Sheffield; Alan Grint, Chertsey; Graeme P. Proud, Staines; Brian Rand, Sheffield, all of England

[73] Assignee: The British Petroleum Company p.l.c., England

[21] Appl. No.: 168,215

[22] Filed: Mar. 15, 1988

[30] Foreign Application Priority Data

Mar. 19, 1987 [GB] United Kingdom ................ 8706499

[51] Int. Cl.$^4$ ........................ B29B 11/12; C01B 31/00
[52] U.S. Cl. .................................. 264/29.7; 264/29.1; 423/449
[58] Field of Search ............................. 264/29.1, 29.7; 423/448, 449; 208/39, 44

[56] References Cited

U.S. PATENT DOCUMENTS

| | | | |
|---|---|---|---|
| 3,995,014 | 11/1976 | Lewis | 264/29.1 |
| 4,293,533 | 10/1981 | Asano et al. | 264/29.1 |
| 4,628,001 | 12/1986 | Sasaki et al. | 264/29.2 |
| 4,671,907 | 6/1987 | Iwahashi et al. | 264/29.7 |
| 4,686,096 | 8/1987 | Schulz et al. | 264/29.2 |

*Primary Examiner*—Jan H. Silbaugh
*Assistant Examiner*—Allan R. Kuhns
*Attorney, Agent, or Firm*—Larry W. Evans

[57] ABSTRACT

Solid carbon materials with improved strength are made from mesophase pitch. The pitch is ground to give particles of diameter less than 10 micrometers and oxidised. Oxidised particles not more than 10 micrometers in diameter are shaped, carbonized, and optionally graphitized.

6 Claims, No Drawings

METHOD OF FORMING BINDERLESS CARBON MATERIALSq

BINDERLESS CARBON MATERIALS

This invention relates to binderless carbon materials.

A method of making binderless carbons has been disclosed in U.S. Pat. No. 4,071,604 which involves heating a carbonaceous precursor so that it is converted to a plastic state. The material is finely ground, pressed into shape and converted to a carbon body by heating to a temperature up to 1200° C., or up to 2,500° C. is graphitised products are required, so forming a single solid component. A problem with this process is that the control of the heat treatment of the carbonaceous precursor must be very precise since too much heating leads to loss of plasticity which is necessary to form a coherent compact, and insufficient heating gives rise to melting, softening or bloating of the compact when the volatiles are released during the carbonisation stage.

GB No. 1 492 832 (Kureha) states the binderless carbons may be produced by forming powdered oxidised pitch into shapes and then heating the shapes to carbonise them. Heating may be carried out under sufficiently severe conditions to graphitise the shapes. The examples show the use of oxidised pitch having a particle size less than 10 micrometers. The oxidised pitch is prepared by treating pitch with oxidising agents. The specification states that the pitch subjected to oxidation may be of relatively small particle size in order to facilitate diffusion of the reactants and may for example be less than 100 micrometers (e.g. less than 50 micrometers).

It is fairly easy to produce particles having a substantial proportion which will pass through a sieve having a diameter corresponding to 50 micrometers. Very fine powders are often difficult to handle and therefore any chemical treatment such as oxidation will be easier to carry out with relatively large particles. Furthermore, special, expensive, grinding equipment is required to produce particles having a substantial proportion of diameter below 10 micrometers.

GB No. 1 492 832 discloses grinding of the *oxidised* carbon to a particle size below 10 micrometers. There is no disclosure of grinding the *unoxidised* carbon to such a particle size. Where a grinding before oxidation is disclosed this produced a relatively coarse material (passing a 200 mesh sieve and thus corresponding to a maximum particle size of about 75 micrometers). This initial grinding is followed by a further grinding to give material below 10 micrometers *after oxidation*.

We have now found that by suitable choice of the pitch subjected to oxidation and by carrying out the severe grinding before and not after oxidation it is possible to obtain improved carbon products.

According to the present invention a process for the production of a solid carbon material comprises:
 (a) grinding a mesophase pitch to form particles smaller than 10 micrometers in diameter,
 (b) subjecting the particles to an oxidation treatment,
 (c) forming the ground oxidised particles having substantially no particles greater than 10 micrometers into a shaped article and
 (d) heating the shaped article to carbonise it.

The Mesophase Pitch

When a pitch is progressively heated, it will soften and become fluid, its viscosity decreasing with increasing temperature. Without being bound by theory, it is thought that, as the material is heated molecules of low molecular weight will evaporate and at higher temperatures cracking reactions and condensation reactions take place leading to an increase in aromaticity and average molecular weight. Due to these changes, a liquid crystalline phase (known as the mesophase) appears and grows at the expense of the rest of the pitch until the pitch is completely transformed into this mesophase. At about this point the viscosity rapidly rises and the material resolidifies. Further heating removes the remaining volatiles, leaving carbon in the form of coke. The molecules in the mesophase have a high mutual orientation and it is because of this orientation, which is locked in upon resolidification, that it is possible to graphitise such carbons. Carbons which have not passed through the liquid phase, enabling mesophase formation, are not graphitisable.

By "mesophase pitch" we mean throughout this specification a material which contains more mesophase than non-mesophase material i.e. has a mesophase content of at least about 50% vol. The mesophase pitch preferably contains at least 75 vol % of mesophase, more preferably more than 95% vol of mesophase.

The mesophase content of the sample of pitch may be determined by optical microscopy. Mesophase regions are optically distinct from non-mesophase regions.

Material may sometimes be available which has the required amount of mesophase. Thus a precursor such as uncalcined coke ("green" coke), which is readily available as a byproduct form oil refiners can be used directly in some cases. Otherwise the mesophase-containing pitch may be prepared from a precursor which does not contain mesophase.

The non-mesophase precursor

The mesophase pitch can be prepared from a non-mesophase-containing precursor.

The precursor material can be any carbonaceous substance that will form a pitch on heat treatment (such as fusible polymers like P.V.C. or hydrocarbon materials, e.g. acenaphthylene) or a substance that is already in the form of pitch (such as petroleum pitch, coal tar pitch or natural bitumen). By careful choice of precursor or by blending of precursors, the optical texture of the mesophase that will be obtained upon heat treatment can be controlled. The main feature of the optical texture of mesophase is the size of domains of common molecular orientation.

By including an oxidation step, discussed in more detail below, a carbon body can be manufactured from mesophase pitch having a wide range of volatile contents and with volatile contents greater than had hitherto been thought possible (i.e. over 11%). The amount of mesophase in the mesophase pitch will depend upon the precursor and the extent of heat treatment and can be varied in a controlled way from 50% to 100%. The portion (if any) of the mesophase pitch that is not mesophase is called isotropic pitch. During oxidation both the mesophase pitch and the isotropic pitch are rendered infusible. This prevents the particles melting and fusing together on further heating. Oxidation also prevents any further mesophase forming form the isotropic pitch. Carbonisation of such a two phase pitch will give rise to a heterogeneous carbon, consisting of controlled amounts of graphitising and non-graphitising components, the amounts of which are determined by the mesophase content prior to oxidation. Carbons, consisting of entirely graphitising carbon can be made by using heat treated precursors containing 100% mesophase.

The precursor material is subjected to heat treatment to reduce the volatile content and to convert the pitch to a given mesophase content. This heat treatment results in a decrease in the volatile content. The decrease in volatile content with increasing mesophase content of the mesophase pitch leads to a reduction of the weight loss and shrinkage upon carbonisation. The temperature used may be in the region of 300° C. to 500° C., but higher temperatures could be used for a short duration. The atmosphere above the pitch must be inert (non-oxidising) and this is generally facilitated by using a flow of nitrogen gas. To maintain uniformity it is necessary to stir or otherwise agitate the pitch during heat treatment, which also helps to release the volatile matter. If the pitch is not stirred, then the mesophase, because of its higher density, will tend to separate out from the pitch to the bottom of the vessel; the upper regions will be depleted of volatiles compared with the bulk, and thermal gradients will also develop across the pitch.

The grinding step

In order to obtain pitch with a particle size less than 10 micrometers it is necessary to use special grinding equipment capable of producing these fine particle sizes. Such equipment is commercially available (e.g. ball mills, micronising mills) and is different from that which is sufficient to produce relatively coarse particles e.g. those which just pass through a 200 mesh British standard sieve (corresponding to a maximum particle size of about 75 micrometers). The mesophase pitch is preferably ground in a liquid medium, e.g. liquid alkanes such as heptane or liquid aromatics e.g. toluene. The grinding may be carried out until substantially all the particles have a diameter below 10 micrometers. Alternatively, grinding may be carried out until a substantial proportion of particles have a particle size below 10 micrometers. The particles are then separated into fractions consisting of particles less than and more than 10 micrometers and the larger particles are returned to the grinding step. The particles less than 10 micrometers may then be passed to the oxidation step. Alternatively, the ground mesophase pitch passed to the oxidation step may contain particles greater than 10 micrometers but such particles are removed from the oxidised product before the particles are formed into shaped articles.

The oxidation step

The oxidising step of the invention may be achieved by heating the powder in an atmosphere of gaseous oxidant, such as air, or by treatment with a liquid phase oxidising agent.

The temperature at which the gaseous oxidation of the powder is carried out is very important. It must be low the temperature at which the mesophase pitch softens, otherwise the powder particles will weld together during the powder oxidation. The temperature must also be kept low enough so that the oxidation reaction does not proceed too quickly. This is because the process is extremely exothermic and if the heat of reaction s not dissipated, then the temperature control will be lost. The amount of oxidation can be obtained by chemical analysis of the powder.

When the powder is to be oxidised in the liquid phase, then the powder is dispersed in a solution of the desired concentration of oxidising agent. The oxidising agent used is preferably nitric acid, but other oxidising agents may also be used. The extent of oxidation is controlled by the concentration of oxidising agent, the contact time and the particle size distribution. The reaction is stopped at the required time by filtering off the oxidising solution and washing the powder with solvent.

It is preferred to oxidise only to the extent that is required to render the mesophase pitch infusible. Further oxidation reduces the density and strength of the final material.

Forming the shaped articles

The forming process for the product is one in which the particles are compacted together in the shape that is required. The particles which are compacted together are those which have been produced by the grinding step preceding the oxidation step. This is in contrast to the process of GB 1 492 832 where the particles which are used to produce a shaped product are those produced by grinding after the oxidation step.

The oxidised carbon which is formed into shaped articles does not contain a substantial amount of particles of size greater than 10 micrometers. This is preferably achieved by ensuring that the particle sizes of the pitch fed to the oxidation step are below this limit. If a high density (low porosity) carbon is required, then a high green density i.e. density prior to carbonisation is needed which means that a high compaction pressure and correct particle size distribution must be used. The preferred forming process is isostatic pressing, but uniaxial or biaxial pressing can also be used. Bodies having a lower green density can be formed by the slip casting process. Suitable aqueous slips can be prepared from the oxidised powder, of very fine particle size, together with suitable deflocculating and stabilising agents. Plastics forming is also possible.

The sintering and carbonisation step

The formed oxidised green body may be carbonized by heating in a non-oxidising atmosphere to a temperature greater than 750° C. The heating rate is controlled so that too rapid an evolution of volatiles, which could disrupt the article, does not occur. The weight loss and the shrinkage of the body during carbonisation both increase with increasing volatile content of the powdered starting material and also with the extent of oxidation.

The resultant carbon can be graphitised, if desired by heating in an inert atmosphere to temperatures of 2500° C. and above.

Another fabrication route is to combine the forming and carbonization processes into one step, by hot pressing the oxidised powder.

The optimum heating and cooling rates will depend on the size of the article. For any given size of article the optimum rates can be readily determined, if necessary after simple tests, by those skilled in the art.

The invention is illustrated by the following experiments in which examples of the invention are identified by numbers and comparative tests are identified by letters.

R values referred to are those define d in UK Pat. No 1492832 to Kureha.

thus the R value is given by:

$$R = (0.54 \times H/C) - f/100$$

where H/C is the hydrogen to carbon atomic ratio of the mesophase pitch before oxidation, and f is the weight per cent of oxygen atoms introduced, based on the weight of the mesophase pitch before oxidation.

EXAMPLE 1

A mesophase pitch having an H/C ratio of 0.44 and a mesophase content of greater than 75% vol was prepared by heating an Ashland A240 pitch, a petroleum pitch having a softening point of 204° F. (115° C.). A sample of the mesophase pitch was ground by wet milling in n-heptane in a "McCrone" (Trade Mark) micronising mill until substantially all the particles had a particle size less than 10 micrometers.

The n-heptane was then removed from the milled powder, which was then oxidised in flowing air at 220° C. until it reached an oxygen content corresponding to an R value of 0.21. The powder was then compacted into a solid body of approximate dimensions diameter 15 mm d length 30 mm under an isostatic pressure of 345 MPa at room temperature. The solid body was then carbonised by being heated to 930° C. at a rate of 15° C./hour under a stream of nitrogen and then being maintained at this temperature for four hours, before being allowed to cool to room temperature at a rate if 30° C./hour. The resultant carbon article had a density of 1.48 g/cm$^3$ and a flexural strength of 80 MPa.

Comparative Test A

A carbon article was prepared from a sample of the same mesophase pitch used in Example 1. The method used was the same as in Example 1 except that the mesophase pitch was not converted into a powder by wet milling in a micronising mill before oxidation. Instead, the mesophase pitch was broken up in a mortar and pestle and a fraction passing a sieve corresponding to a maximum particle size of 75 micrometers was collected and subjected to the oxidation step. The oxidised powder was then ground to give a powder having substantially no particles greater than 10 micrometers. The powder was then compacted and carbonised as in Example 1. The resultant carbon article had a density of 1.47 g/cm$^3$ and a flexural strength of 40 MPa.

EXAMPLE 2

A third sample of the mesophase pitch used in Example 1 was converted into a carbon article as in Example 1 except that oxidation was carried out to give an R value of 0.20. The resultant carbon article had a density of 1.47 g/cm$^3$ and a flexural strength of 73 MPa.

Comparative Test B

A fourth sample of the mesophase pitch used in Example 1 was converted into a carbon article as in Comparative Test A except that oxidation was carried out to give a R-value of 0.20 (as in Example 2). The resultant carbon article had a density of 1.46 g/cm$^3$ and a flexural strength of 41 MPa.

EXAMPLE 3

A fifth sample of the mesophase pitch used in Example 1 was converted into a carbon article as in Example 1 except that oxidation was carried out to give an R value of 0.18. The resultant carbon article had a density of 1.43 g/cm$^3$ and a flexural strength of 60 MPa.

Comparative Test C

A sixth sample of the mesophase pitch used in Example 1 was converted into a carbon article as in Comparative Test A except that oxidation was carried out to give an R-value of 0.19. The resultant carbon article had a density of 1.41 g/cm$^3$ and a flexural strength of 25 MPa.

Comparative Tests A, B, and C correspond to experiments in accordance with GB No. 1 492 832 where pitch is ground to a relatively coarse size before oxidation and is then ground for a second time to a much finer particle size. A comparison between Example 1 and Test A shows that the process of the invention resulted in a doubling of the flexural strength of the resultant carbon compared with a carbon made in accordance with GB No. 1 492 832. Large increases in flexural strength can also be seen from comparisons between Example 2 and Test D and Example 3 and Test C. Although the absolute value of the flexural strength may change as the R-value of the oxidised pitch changes, the carbon made by the process of the invention is consistently superior in flexural strength to the carbon made in accordance with GB No. 1 492 832.

EXAMPLES 4-6

Experiments were carried out as in Example 1 except that the petroleum pitch was converted into a mesophase pitch with a mesophase content of at least 75% vol and an H/C ratio of 0.50 and oxidation was carried out to give R values of 0.23, 0.22 and 0.19 corresponding to an addition of 4.1% wt, 5.0% and 8.0% oxygen respectively. The density and flexural strength of the carbon articles are shown in Table 1.

Comparative Test D

An experiment was carried out as in Example 4, except that the oxidation step was omitted. The results are shown in Table 1.

TABLE 1

| Properties of Binderless Carbons | | | |
|---|---|---|---|
| Experiment | Oxygen Added /wt % | R | Density of Carbon g/cm | Flexural Strength/MPa |
| D | 0 | 0.27 | 1.66 | Severely Cracked |
| 4 | 4.1 | 0.23 | 1.56 | 117 |
| 5 | 5.0 | 0.22 | 1.54 | 111 |
| 6 | 8.0 | 0.19 | 1.47 | 95 |

EXAMPLE 7

Ashland A240 petroleum pitch was converted by heating to a mesophase pitch having a mesophase content of greater than 95% vol and a H/C ratio of 0.49.

The mesophase pitch was converted into carbon articles as in Example 1, expect that oxidation was carried out so as to give an oxygen content of 4.5 weight %, and the articles to be carbonised were made by uniaxial die pressing at 509 MPa resulting in disc shaped specimens of diameter 25 mm and thickness 3 mm.

The resulting carbon articles had bulk densities of 1.66–1.68 g/cm$^3$ and flexural strengths of 130–140 MPa.

The carbon articles were graphitised by heating under a stream of helium to 2500° C. The resulting graphite articles had bulk densities of 1.92–1.94 g/cm$^3$ and flexural strengths of 120–122 MPa.

EXAMPLE 8

Example 7 was repeated but with the oxidation carried out to given an oxygen content of 3.7 weight %. The resulting graphite body had a bulk density of 1.96g/cm³ and a flexural strength of 142 MPa.

EXAMPLE 9

An experiment was carried out as in Example 7 except that the mesophase pitch had a H/C ratio of 0.47. The oxidation in flowing air was carried out until an oxygen content of 2.4% wt was reached.

The graphite body had a bulk density of 1.96 g/cm³ and a flexural strength of 145 MPa.

EXAMPLE 10

An experiment was carried out as in Example 7 except that the mesophase-containing pitch had an H/C ratio of 0.46 and the oxidation in flowing air was carried out to give an oxygen content of 3.3% wt.

The graphite body had a bulk density of 1.73 g/cm³ and a flexural strength of 134 MPa.

We claim:

1. A process for the production of a solid carbon material having improved flexural strength which process comprises:
   (a) grinding an unoxidized mesophase pitch and recovering ground particles to form ground particles substantially all of which are smaller than 10 micrometers in diameter,
   (b) subjecting said ground particles to an oxidation treatment,
   (c) forming said ground oxidized particles having substantially no particles greater than 10 micrometers into a shaped article and
   (d) carbonising the article.
2. A process as claimed in claim 1 wherein the mesophase pitch contains at least 75% vol mesophase.
3. A process as claimed in claim 2 wherein the mesophase pitch contains at least 95% vol of mesophase.
4. A process according to claim 1 wherein the shaped article is heated to a temperature sufficient to graphitise it.
5. A process as claimed in claim 2 wherein the shaped article is heated to a temperature sufficient to graphitise it.
6. A process as claimed in claim 3 wherein the shaped article is heated to a temperature sufficient to graphitise it.

* * * * *